United States Patent
Cheong et al.

(10) Patent No.: US 9,113,313 B2
(45) Date of Patent: Aug. 18, 2015

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Minho Cheong, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 244 days.

(21) Appl. No.: 13/712,895

(22) Filed: Dec. 12, 2012

(65) Prior Publication Data

US 2013/0188627 A1    Jul. 25, 2013

(30) Foreign Application Priority Data

Dec. 12, 2011    (KR) .................. 10-2011-0132978
Dec. 13, 2011    (KR) .................. 10-2011-0133965

(51) Int. Cl.
*H04W 4/00* (2009.01)
*H04W 4/08* (2009.01)
*H04B 7/02* (2006.01)
*H04W 74/04* (2009.01)

(52) U.S. Cl.
CPC ............. *H04W 4/08* (2013.01); *H04B 7/024* (2013.01); *H04B 7/026* (2013.01); *H04W 74/04* (2013.01)

(58) Field of Classification Search
None
See application file for complete search history.

(56) References Cited

U.S. PATENT DOCUMENTS

| 6,005,869 | A | 12/1999 | Sakai et al. |
| 2008/0292011 | A1* | 11/2008 | Yang ............................ 375/260 |
| 2011/0096738 | A1* | 4/2011 | Choi ............................ 370/329 |
| 2011/0124345 | A1* | 5/2011 | Lee et al. ................... 455/452.2 |
| 2013/0034136 | A1* | 2/2013 | Park et al. ..................... 375/219 |

FOREIGN PATENT DOCUMENTS

| JP | 2007-311857 A | 11/2007 |
| KR | 1019980041709 A | 8/1998 |
| KR | 1020110044717 A | 4/2011 |
| WO | WO 2011132898 A2 * | 10/2011 |

* cited by examiner

*Primary Examiner* — Christopher Crutchfield

(57) ABSTRACT

Disclosed is a method for allowing a terminal to transmit/receive data using a multi user-multi input multi output (MU-MIMO) scheme in a communication system, the method including: receiving group information of terminals capable of transmitting/receiving data using the MU-MIMO scheme from an access point (AP); transmitting the group information of the terminals and group information of candidate terminals capable of transmitting/receiving data using the MU-MIMO based on the group information of the terminals to the candidate terminals, respectively; and transmitting/receiving data to/from the candidate terminals using the MU-MIMO scheme in response to the group information of the candidate terminals.

17 Claims, 5 Drawing Sheets

APPARATUS AND METHOD FOR TRANSMITTING/RECEIVING DATA IN COMMUNICATION SYSTEM

CROSS-REFERENCES TO RELATED APPLICATIONS

The present application claims priority of Korean Patent Application Nos. 10-2011-0132978 and 10-2011-0133965, filed on Dec. 12, 2011, and Dec. 13, 2011, respectively, which are incorporated herein by reference in their entirety.

BACKGROUND OF THE INVENTION

1. Field of the Invention

Exemplary embodiments relate to a communication system, and more particularly, to an apparatus and a method for transmitting/receiving data between a base station, for example, an access point (hereinafter, referred to as 'AP') and a plurality of terminals, for example, stations (hereinafter, referred to as 'STA') and between the plurality of stations using a multi user-multi input multi output (hereinafter, referred to as 'MU-MIMO') scheme, in a communication system.

2. Description of Related Art

In a current communication system, researches for providing services having various qualities of services (hereinafter, referred to as QoSs) to users at a high transmission rate have been actively conducted. In a wireless local area network (hereinafter, referred to as 'WLAN') that is an example of the communication system, researches into methods for transmitting large-capacity data at high speed and stably using a limited resource have been actively conducted. In particular, in a communication system, researches into data transmission through a wireless frequency channel have been conducted. Recently, methods for normally transmitting/receiving large-capacity data by enabling a WLAN system to effectively use a limited wireless channel have been proposed.

Meanwhile, in the current communication system, in order to effectively transmit large-capacity data to multiple users, in particular, improve data transmitting/receiving performance, a MU-MIMO scheme has been proposed. However, in the current communication system, the foregoing MU-MIMO scheme may be supported only in a downlink transmitting data from the base station, for example, the access point (hereinafter, referred to as 'AP') to the plurality of terminals, for example, STAs. Therefore, there is a limitation in applying the foregoing MU-MIMO scheme under the environment in which the large-capacity data are transmitted/received between the plurality of STAs.

Therefore, in the communication system, for example, the WLAN system, a need exists for a method for normally transmitting/receiving data using the MU-MIMO scheme, even at the time of transmitting/receiving data between the AP and the plurality of STAs and data between the plurality of STAs.

SUMMARY OF THE INVENTION

An embodiment of the present invention is directed to an apparatus and a method for transmitting/receiving data in a communication system.

Another embodiment of the present invention is directed to an apparatus and a method for normally transmitting/receiving large-capacity data using a MU-MIMO scheme, in a communication system.

Still another embodiment of the present invention is directed to an apparatus and a method for normally transmitting/receiving large-capacity data between an AP and a plurality of STAs and between the plurality of STAs using a MU-MIMO scheme, in a communication system.

Yet another embodiment of the present invention is directed to an apparatus and a method for normally transmitting/receiving large-capacity data between an AP and a plurality of STAs included in a plurality of mesh networks and between the plurality of STAs using a MU-MIMO scheme, in a communication system.

In accordance with an embodiment of the present invention, there is provided a method for allowing a terminal to transmit/receive data using a multi user-multi input multi output (MU-MIMO) scheme in a communication system, the method including: receiving group information of terminals capable of transmitting/receiving data using the MU-MIMO scheme from an access point (AP); transmitting the group information of the terminals and group information of candidate terminals capable of transmitting/receiving data using the MU-MIMO based on the group information of the terminals to the candidate terminals, respectively; and transmitting/receiving data to/from the candidate terminals using the MU-MIMO scheme in response to the group information of the candidate terminals.

In accordance with another embodiment of the present invention, there is provided a method for allowing an access point (AP) to transmit/receive data using a multi user-multi input multi output (MU-MIMO) scheme in a communication system, the method including: receiving terminal information from terminals capable of transmitting/receiving data using the MU-MIMO scheme; grouping the terminals based on the terminal information and transmitting group information of the terminals to the terminals; and transmitting/receiving data to/from the terminals using the MU-MIMO based on the group information of the terminals, wherein the data are transmitted/received between the terminals using the MU-MIMO based on the group information of the terminals.

In accordance with still another embodiment of the present invention, there is provided an apparatus for transmitting/receiving data using a multi user-multi input multi output (MU-MIMO) scheme in a communication system, the apparatus including: a receiving unit configured to receive group information of terminals capable of transmitting/receiving data using the MU-MIMO scheme from an access point (AP); an acknowledgement unit configured to acknowledge the group information of the groups; and a transmitting unit configured to transmit the group information of the terminals and group information of candidate terminals capable of transmitting/receiving data using the MU-MIMO based on the group information of the terminals to the candidate terminals, respectively, wherein the receiving unit and the transmitting unit transmit/receive data to/from the candidate terminals using the MU-MIMO in response to the group information of the candidate terminals.

In accordance with yet another embodiment of the present invention, there is provided an apparatus for transmitting/receiving data using a multi user-multi input multi output (MU-MIMO) scheme in a communication system, the apparatus including: a receiving unit configured to receive terminal information from terminals capable of transmitting/receiving data using the MU-MIMO scheme; a generation unit configured to group the terminals based on the terminal information and generate a frame including group information of the terminals; and a transmitting unit configured to transmit the frame including the group information of the terminals, wherein the transmitting unit and the receiving unit transmit/ receive data to/from the terminals using the MU-MIMO based on the group information of the terminals, and the data are transmitted/received between the terminals using the MU-MIMO based on the group information of the terminals.

DESCRIPTION OF SPECIFIC EMBODIMENTS

Hereinafter, exemplary embodiments of the present invention will be described in detail with reference to the accompanying drawings. It is to be noted that only components required to understand an operation in accordance with the present invention is described below and the description of other components will be omitted not to unnecessarily obscure the subject matters of the present invention.

An embodiment of the present invention proposes an apparatus and a method for transmitting/receiving data in a communication system, for example, a wireless local area network (hereinafter, referred to as 'WLAN') system. Herein, the embodiment of the present invention describes the WLAN system by way of example, but a method for transmitting/receiving data in accordance with the embodiment of the present invention may also be applied to other communication systems.

Further, the embodiment of the present invention proposes an apparatus and a method for transmitting/receiving data using a multi user-multi input multi output (hereinafter, referred to as 'MU-MIMO') in the IEEE 802.11n system or the IEEE 802.11ac system as a communication system, for example a WLAN system. Herein, the embodiment of the present invention transmits/receives data between a base station, for example, an access point (hereinafter, referred to as 'AP') and a plurality of terminals, for example, stations (hereinafter, referred to as 'STA') using the multi user-multi input multi output (hereinafter, referred to as 'MU-MIMO') scheme and transmits/receives data between the STAs using the MU-MIMO scheme.

In this case, in the communication system in accordance with the embodiment of the present invention, group information of STAs capable of transmitting/receiving data using the MU-MIMO scheme may be transmitted/received through a corresponding frame and STAs included in the group infor-
mation are transmitted/received to/from an AP and other STAs using the MU-MIMO scheme. Further, in the embodiment of the present invention, as described above, the group information of the STAs capable of transmitting/receiving data using the MU-MIMO scheme is transmitted/received through the corresponding frame, in the AP and the plurality of STAs included in the plurality of mesh networks in the communication system, thereby normally transmitting/receiving large-capacity data between the AP and the plurality of STAs and between the plurality of STAs using the MU-MIMO scheme. Hereinafter, a mesh network structure in a communication system in accordance with an embodiment of the present invention will be described in more detail with reference to FIG. 1.

Figure 1:
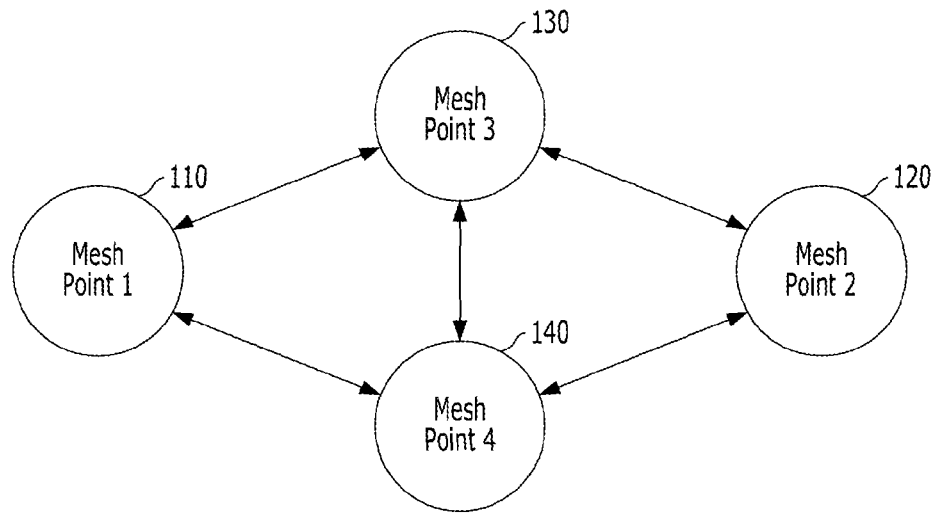
FIG. 1 is a diagram schematically illustrating a mesh network structure in a communication system in accordance with an embodiment of the present invention.

FIG. 1 is a diagram schematically illustrating the mesh network structure in the communication system in accordance with the embodiment of the present invention.

Referring to FIG. 1, the communication system includes mesh networks of a plurality of mesh points 110, 120, 130, and 140. Hereinafter, for convenience of explanation, among the plurality of mesh points 110, 120, 130, and 140, the mesh point 1 110 may be assumed to be a first AP included in a first mesh network, a second mesh point 2 120 is assumed to be a second AP included in a second mesh network, a mesh point 3 130 is assumed to be a first STA included in the second mesh network, and a mesh point 4 140 is assumed to be a second STA included in the first mesh network and the second mesh network. That is, the communication system includes the first mesh network and the second mesh network, the first mesh network includes a first AP 110, a first STA 130, and a second STA 140, and the second mesh network includes a second AP 120, the first STA 130, and the second STA 140.

As described above, data are transmitted/received between the APs 110 and 120 and the STAs 130 and 140 included in the first mesh network and the second mesh network using the MU-MIMO scheme and data are also transmitted/received between the STAs 130 and 140 included in the first mesh network and the second mesh network using the MU-MIMO scheme. In this case, in the APs 110 and 120 and the STAs 130 and 140 included in the first mesh network and the second mesh network, the group information of the STAs capable of transmitting/receiving data using the MU-MIMO scheme is transmitted/received through the corresponding frame, such that the large-capacity data are normally transmitted/received between the APs 110 and 120 and the STAs 130 and 140 and between the STAs 130 and 140 using the MU-MIMO scheme. Herein, a frame structure in the communication system in accordance with the embodiment of the present invention will be described in more detail with reference to FIG. 2.

Figure 2:
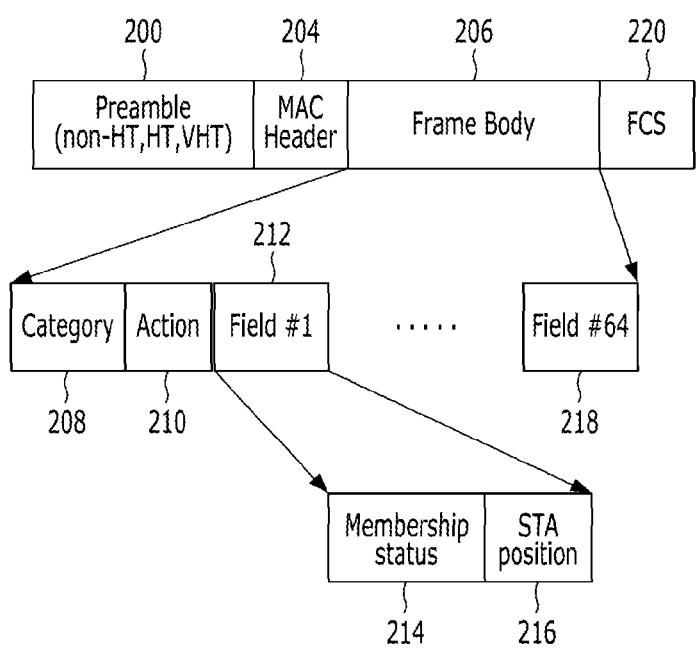
FIGS. 2 and 3 are diagrams schematically illustrating a frame structure in the communication system in accordance with the embodiment of the present invention.

FIG. 2 is a diagram schematically illustrating the frame structure in the communication system in accordance with the embodiment of the present invention.

Referring to FIG. 2, a plurality of STAs are grouped and then the frame includes a preamble 202, such as non-high throughput (HT), HT, very high throughput (VHT), and the like, a media access control (MAC) header 204, a frame body 206, and a frame check sequence (FCS) 220, as a group ID assignment frame for transmitting group IDs to the grouped STA groups.

Herein, the frame body 206 includes a category 208 indicating the VHT, an action 210 indicating the group ID assignment, and fields 212 and 218 including information of the STAs included in the group corresponding to the group IDs and each of the fields 212 and 218 includes a membership status 214 of 1 bit indicating whether the STA group is included and an STP position 216 indicating a spatial stream position of the STA in the corresponding group. Further, each of the fields 212 and 218 corresponds to a group ID table of the STAs.

The group IDs of the STAs included in the frame are updated and even when all the group IDs are updated, a fixed payload, for example, a fixed payload of 24 octets remains. Further, in the foregoing frame, in case of a single user (SU), not multi users, the membership status 214 and the STA position 216 corresponding to a single user group ID field become 1. That is, the frame includes the group information of the STAs capable of transmitting/receiving data using the MU-MIMO scheme. Herein, a frame structure in a communication system in accordance with another embodiment of the present invention will be described in more detail with reference to FIG. 3.

Figure 3:
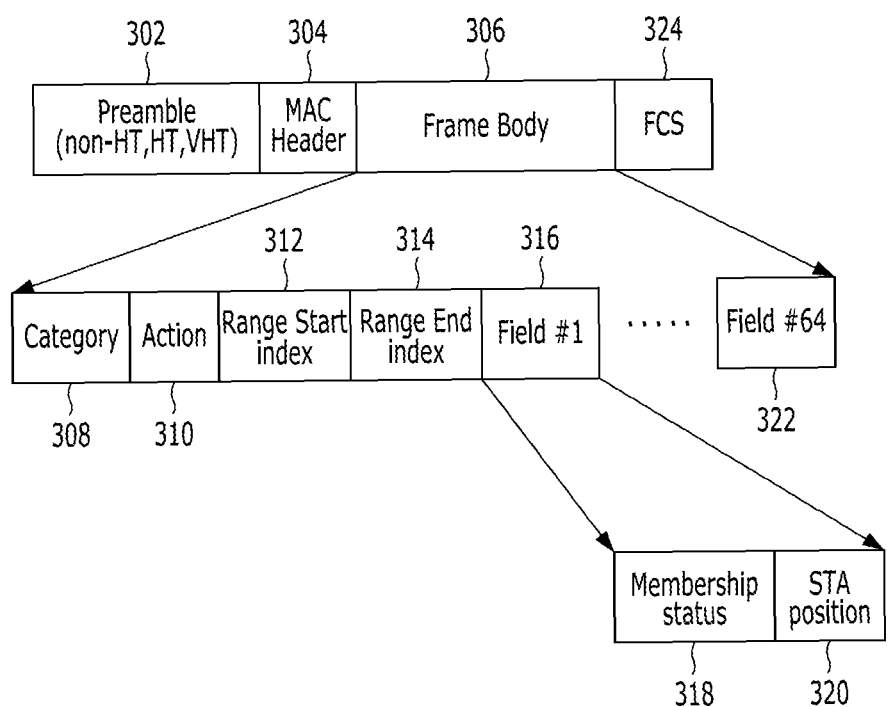

FIG. 3 is a diagram schematically illustrating the frame structure in the communication system in accordance with another embodiment of the present invention.

Referring to FIG. 3, the plurality of STAs are grouped and then the frame includes a preamble 302, such as non-HT, HT, VHT, and the like, a MAC header 304, a frame body 306, and an FCS 324, as a group ID assignment frame for transmitting group IDs to the grouped STA groups.

Herein, the frame body 306 includes a category 208 indicating the VHT, an action 210 indicating the group ID assignment, a range start index 212 indicating a group ID index range start, a range end index 314 indicating a group ID index range end, and fields 316 and 322 including information of the STAs included in the group corresponding to the group IDs and each of the fields 316 and 322 includes a membership status 318 of 1 bit indicating whether the STA group is included and an STP position 320 indicating a spatial stream position of the STA in the corresponding group. Further, each of the fields 316 and 322 corresponds to a group ID table of the STAs.

Further, the group IDs of the STAs included in the frame are updated and in case of a single user (SU), not multi users, the membership status 218 and the STA position 320 corresponding to a single user group ID field become 1. Further, a receiving apparatus receiving the frame, for example, a beamformee parses groups in a range corresponding to the range start index 312 and a range end index 314. That is, the frame includes the group information of the STAs capable of transmitting/receiving data using the MU-MIMO scheme. Hereinafter, in the communication system in accordance with the embodiment of the present invention, an operation of transmitting/receiving data between the AP and the plurality of STAs and between the plurality of STAs using the MU-MIMO scheme by transmitting/receiving the frame as described above will by described in more detail.

First, when any STA transmits/receives data to/from a plurality of other STAs, for example, candidate STAs using the MU-MIMO scheme, the STA requests an authority for transmission/reception of data using the MU-MIMO scheme in order to transmit/receive data between the AP and the candidate STAs using the MU-MIMO scheme. That is, the STA transmits an authority request message for the MU-MIMO scheme to be applied at the time of transmitting/receiving data to/from other STAs.

In addition, the AP receiving the request of the authority for the MU-MIMO scheme from the STA responds to the STA in connection with the information of group management of the STAs, that is, the group information of the STAs. In this case, the AP transmits a token for the authority of the MU-MIMO scheme requested by the STA. Herein, as described above, the AP transmits the group information of the STAs and the frame including the group ID to the STA. Herein, the frame is already described in detail, and therefore the detailed description thereof will be omitted.

Further, the STA receives the token for the authority for the MU-MIMO scheme from the AP to be assigned with the authority for the MU-MIMO scheme and confirms the information of the STAs included in the frame, that is, the group information of the STAs and then generates the group of the candidate STAs to transmit/receive data to/from the STA, using the MU-MIMO scheme. In other words, the STA confirms the candidate STAs capable of transmitting/receiving data to/from the STA using the MU-MIMO scheme through the group information of the STAs included in the frame and groups the candidate STAs. Further, the STA transmits the group information of the foregoing candidate STAs to the candidate STAs, respectively and transmits/receives data to/from the candidate STAs in response to the group information of the candidate STAs using the MU-MIMO scheme. Herein, when the transmission/reception of data between the STA and the candidate STAs using the MU-MIMO scheme is completed, the STA returns the authority for the MU-MIMO scheme assigned from the AP, that is, transmits the token for the authority of the MU-MIMO scheme to the AP.

Further, the AP receives the authority for the MU-MIMO scheme assigned to any STA in advance, that is, the token transmitted to any STA, prior to assigning the authority for the MU-MIMO scheme to other STAs, that is, transmitting the token to other STAs.

Further, in the communication system in accordance with the embodiment of the present invention, in order to transmit/receive data between the AP and the plurality of STAs and between the plurality of STAs using the MU-MIMO scheme by transmitting/receiving the frame as described above, any STA requests the authority for the transmission and reception of data using the MU-MIMO scheme as described above. In this case, any STA may also request the authority including the candidate group information of the candidate STAs capable of transmitting/receiving data to the STA using the MU-MIMO scheme. In other words, the STA requests the authority for the transmission and reception of data using the MU-MIMO scheme to the AP and also requests the candidate group information of the candidate STAs capable of transmitting/receiving data to/from the STA using the MU-MIMO scheme to the AP, that is, transmits the authority for the MU-MIMO scheme to be applied at the time of transmitting/receiving data to/from other STAs and a message requesting the candidate group information the candidate STAs to transmit/receive data using the MU-MIMO scheme to the AP.

In addition, the AP receiving the request of the authority for the MU-MIMO scheme and the candidate group information from the STA responds to the STA in connection with the information of the group management of the candidate STAs in all the STAs, that is, the candidate group information of the candidate STAs. In this case, the AP transmits the token for the authority of the MU-MIMO scheme requested by the STA. Herein, as described above, the AP transmits the group information of the candidate STAs and the frame including the group ID to the STA, in particular, the frame includes the information of the candidate group of the candidate STAs in the group of all the STAs, that is, information of a range of a candidate STA group index in all the STA group indexes, that is, the range start index indicating the group ID index range start and the range end index indicating the group ID index range end.

Further, the STA receives the token for the authority for the MU-MIMO scheme from the AP to be assigned with the authority for the MU-MIMO scheme and confirms the information of the candidate STAs included in the frame, that is, the group information of the candidate STAs and then generates a group of final STAs to transmit/receive data to/from the STA, using the MU-MIMO scheme. In other words, the STA confirms the final STAs capable of transmitting/receiving data to/from the STA using the MU-MIMO scheme through the group information of the STAs included in the frame and groups the final STAs. Further, the STA transmits the group information of the foregoing final STAs to the final STAs, respectively and transmits/receives data to/from the final STAs in response to the group information of the final STAs using the MU-MIMO scheme. Herein, when the transmission/reception of data between the STA and the final STAs using the MU-MIMO scheme is completed, the STA returns the authority for the MU-MIMO scheme assigned from the AP, that is, transmits the token for the authority of the MU-MIMO scheme to the AP. Herein, the frame body of the frame in the mesh network structure in a communication system in accordance with an embodiment of the present invention will be described in more detail with reference to FIG. 4.

Figure 4:
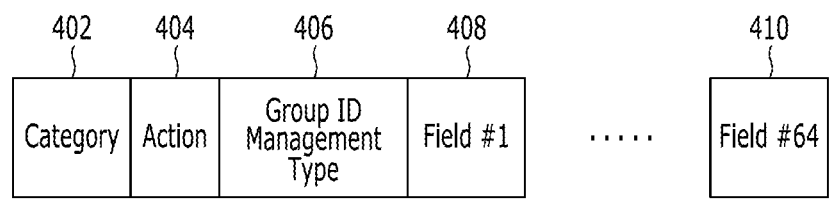
FIG. 4 is a diagram schematically illustrating a frame body structure of a frame in the communication system in accordance with the embodiment of the present invention.

FIG. 4 is a diagram schematically illustrating the frame body structure of the frame in the communication system in accordance with the embodiment of the present invention.

Referring to FIG. 4, as described above, the frame body of the frame includes a category 402 indicating the VHT, an action 404 indicating group ID assignment or group ID announcement as two types of group IDs, and fields 408 and 410 including information of STAs included in a group corresponding to the group IDs and each of the fields 408 and 410 corresponds to a group ID table of the STAs.

Herein, when the type of the action 404 is a first type, the action 404 includes information indicating the group ID for the group of the grouped STAs grouped by the AP in the mesh network, that is, information indicating the group ID assigned to the group of the STAs capable of transmitting/receiving data using the MU-MIMO scheme. In addition, when the type of the action 404 is a second type, the action 404 includes the information indicating the group ID for the group of the STAs received from the AP in the mesh network, that is, information indicating the group ID receiving the information of the group of the STAs capable of transmitting/receiving data using the MU-MIMO scheme from the AP to announce the received information to other mesh networks. That is, when the type of the action 404 is the first type, that is, the group ID assignment, the group information of the STAs included in the frame means the information transmitted from the AP to the STA and when the type of the action 404 is the second type, that is, the group ID announcement, the group information of the STAs included in the frame means the information that the STA transmits the information received from the AP to the PA or the STAs. Hereinafter, in the communication system in accordance with the embodiment of the present invention, an operation of transmitting/receiving data between the AP and the plurality of STAs included in the mesh networks and between the plurality of STAs using the MU-MIMO scheme by transmitting/receiving the frame as described above will by described in more detail with reference to the mesh networks illustrated in FIG. 1.

First, when any STA, for example, the first STA 130 transmits/receives data to/from the APs 110 and 120 as well as the plurality of STAs, for example, the second STA 140 using the MU-MIMO scheme, the first STA 130 as well as the STAs connected to the APs 110 and 120 transmits its own terminal information, for example, capability information indicating that the data can be transmitted/received using the MU-MIMO scheme to the APs 110 and 120.

Further, the APs 110 and 120 groups the STAs based on the received terminal information, for example, the capability information indicating that the data can be transmitted/received and assigns the group ID to the group of the STAs, using the MU-MIMO scheme. For example, the first AP 110 of the first mesh network including the first STA 130 groups the STAs and then assigns the group ID to the group of the STAs, and transmits the group information of the group of the STAs through the frame, as described above. Herein, the frame includes the information indicating the group ID assignment when the type of the action is the first type and also includes the group ID, group number information indicating a group number of the STAs corresponding to each group ID table, positional information indicating a spatial stream position of the STAs, and the like. Herein, the frame is already described in detail, and therefore the detailed description thereof will be omitted.

The first STA 130 receiving the frame from the first AP 110 transmits the frame received from the first AP 110 to the second AP 120 of the second mesh network included therein. Herein, the frame includes the information indicating the group ID announcement when the type of the action is the second type and also includes the group ID, group number information indicating a group number of the STAs corresponding to each group ID table, positional information indicating a spatial stream position of the STAs, and the like.

In addition, the second AP 120 included in the second mesh network groups the STAs and assigns the group ID to the group of the STAs, based on the capability information indicating that the data can be transmitted/received using the MU-MIMO scheme, as in the first AP 110 included in the foregoing first mesh network. In this case, the second AP 120 confirms the group information of the STAs grouped by the second AP 120, that is, the group information on the STAs in the second mesh network and the group information of the STAs included in the frame received from the first STA 130, that is, the group information of the STAs in the first mesh network, respectively.

In this case, when the group information of the STAs in the second mesh network is the same as the group information of the STAs in the first mesh network, that is, when the group IDs corresponding to the first STAs 130 included in the first mesh network and the second mesh network are the same, the collision between the group IDs may occur, such that the second AP 120 included in the second mesh network assigns the group ID corresponding to the first STA 130 in the second mesh network as the group ID different from the group ID in the first mesh network.

That is, the second AP 120 generates the group information corresponding to the first STA 130 in the second mesh network as the group information different from the group information corresponding to the first STA 130 in the first mesh network and transmits the frame including the group information in the second mesh network different from the group information in the first mesh network to the first STA 130. Therefore, the first STA 130 is assigned with the different group information, for example, the different group information in the first mesh network and the second mesh network. Further, the first STA 130 transmits/receives data to/from the APs 110 and 120 using the MU-MIMO scheme based on the group information and also transmits/receives data to/from other STAs, for example, the second STA 140 using the MU-MIMO scheme.

Herein, as described above, the first STA 130 receives the group information of the STAs in the first mesh network through the frame from the first AP 110 and also receives the group information of the STAs in the second mesh network through the frame from the second AP 120 and transmits the frame including the received group information to the first AP 110 and the second AP 120. In this case, the first STA 130 transmits the frame including the group information of the STAs in the first mesh network to the second AP 120 included in the second mesh network and transmits the frame including the group information of the STAs in the second mesh network to the first AP 110 included in the first mesh network. Herein, the first STA 130 confirms the group information received from the APs 110 and 120 to transmit the information indicating that the group information is the same to the APs 110 and 120 when each group information is the same, for example, makes the group ID in the first mesh network equal to the group ID in the second mesh network when the group IDs are the same to transmit the group ID collision information to the APs 110 and 120.

As described above, the APs 110 and 120 receiving the group information of the STAs in each mesh network differently generates the group information of the mesh network included in the APs when the group information is the same, for example, differently assigns the group ID in the mesh network included in the APs when the group IDs are the same. Further, as described above, when receiving the information indicating that the group information from the first STA 130 is the same, for example, the group ID collision information, the APs 110 and 120 differently generates the group information in their own mesh network, for example, assigns the different group IDs.

Further, the APs 110 and 120 transmits the frame including the group information to the first STA 130, such that the first STA 130 transmits/receives data to/from the APs 110 and 120 using the MU-MIMO scheme based on the group information and also transmits/receives data to/from other STAs, for example, the second STA 140 using the MU-MIMO scheme. Herein, a frame structure in the communication system in accordance with the embodiment of the present invention will be described in more detail with reference to FIG. 5.

Figure 5:
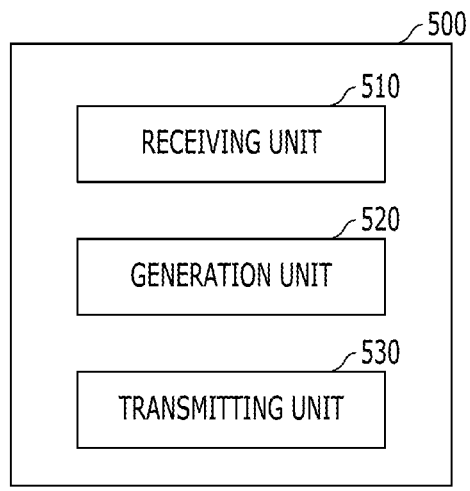
FIG. 5 is a diagram schematically illustrating an AP structure in the communication system in accordance with the embodiment of the present invention.

FIG. 5 is a diagram schematically illustrating the AP structure in the communication system in accordance with the embodiment of the present invention.

Referring to FIG. 5, the AP 500 includes a receiving unit 510 that receives the terminal information from the STAs, the group information in another mesh network including the STAs, and the information indicating that the group information is the same, a generation unit 520 generating the frame including the group information of the STAs in the mesh network included in the AP 500 based on the information received through the receiving unit 510, and a transmitting unit 530 transmitting the generated frame to the STAs.

As described above, when any STA included in the plurality of mesh networks transmits/receives data the APs included in the plurality of mesh networks and other STAs using the MU-MIMO scheme, the AP 500 transmits/receives the frame including the group information of the STAs in the plurality of mesh networks to/from the STAs to transmit/receive data between the APs and the STAs and between the STAs using the MU-MIMO scheme. Herein, the operation of transmitting/receiving data between the APs and the STAs and between the STAs using the MU-MIMO scheme is already described in detail, and therefore the detailed description thereof will be described. Herein, the operation of the AP in the communication system in accordance with the embodiment of the present invention will be described in more detail with reference to FIG. 6.

Figure 6:
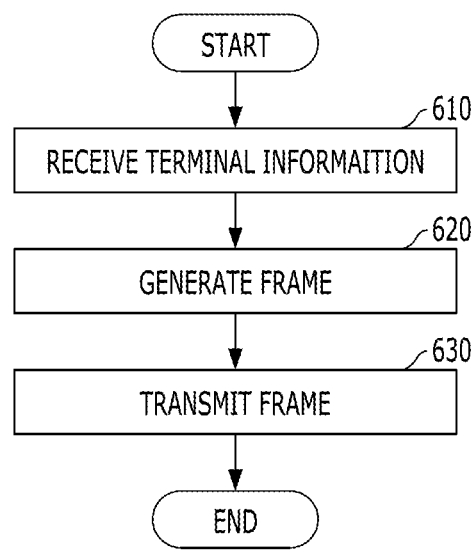
FIG. 6 is a diagram schematically illustrating a process of transmitting/receiving data using a MU-MIMO scheme of the AP in the communication system in accordance with the embodiment of the present invention.

FIG. 6 is a diagram schematically illustrating a process of transmitting/receiving data using the MU-MIMO scheme of the AP in the communication system in accordance with the embodiment of the present invention.

Referring to FIG. 6, in S610, the AP receives the terminal information from the STAs. Herein, the terminal information includes the capability information indicating that the STAs can transmit/receive data using the MU-MIMO scheme.

Next, in S620, based on the received terminal information, the STAs are grouped and then generates the frame including the group information on the group of the STAs and in S630, the frame including the group information of the STAs is transmitted to the STAs. Herein, the frame is already described in detail, and therefore the detailed description thereof will be omitted.

In this case, when the frame including the group information of the STAs is transmitted, the group information in another mesh network including the STAs and the information indicating that the group information is the same are received from the STAs and the frame including the group information of the STAs in the mesh network including the STAs is generated based on the received information and is transmitted to the STAs. As described above, when any STA included in the plurality of mesh networks transmits/receives data the APs included in the plurality of mesh networks and other STAs using the MU-MIMO scheme, the AP transmits/receives the frame including the group information of the STAs in the plurality of mesh networks to/from the STAs to transmit/receive data between the APs and the STAs and between the STAs using the MU-MIMO scheme. Herein, the operation of transmitting/receiving data between the APs and the STAs and between the STAs using the MU-MIMO scheme is already described in detail, and therefore the detailed description thereof will be described. Herein, the STA structure in the communication system in accordance with the embodiment of the present invention will be described in more detail with reference to FIG. 7.

Figure 7:
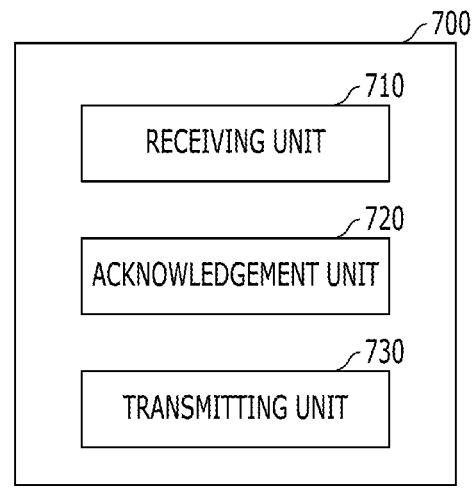
FIG. 7 is a diagram schematically illustrating an STA structure in the communication system in accordance with the embodiment of the present invention.

FIG. 7 is a diagram schematically illustrating the STA structure in the communication system in accordance with the embodiment of the present invention.

Referring to FIG. 7, an STA 700 includes a receiving unit 710 receiving the frame including the group information of the STAs capable of transmitting/receiving data using the MU-MIMO scheme, an acknowledgement unit 720 acknowledging the group information of the STAs included in the received frame, and a transmitting unit 730 transmitting the received frame to the AP included in another mesh network and the transmitting/receiving units 710 and 730 transmits/receives data to/from the AP and other STAs using the MU-MIMO scheme based on the group information of the STAs.

As described above, in order to transmit/receive data to/from the APs and other SPAs included in the plurality of mesh networks using the MU-MIMO scheme, the STA 700 transmits/receives the frame including the group information of the STAs in the plurality of mesh networks to/from the STAs to transmit/receive data between the APs and the STAs and between the STAs using the MU-MIMO scheme. Herein, the operation of transmitting/receiving data between the APs and the STAs and between the STAs using the MU-MIMO scheme is already described in detail, and therefore the detailed description thereof will be described. Herein, the operation of the STA in the communication system in accordance with the embodiment of the present invention will be described in more detail with reference to FIG. 8.

Figure 8:
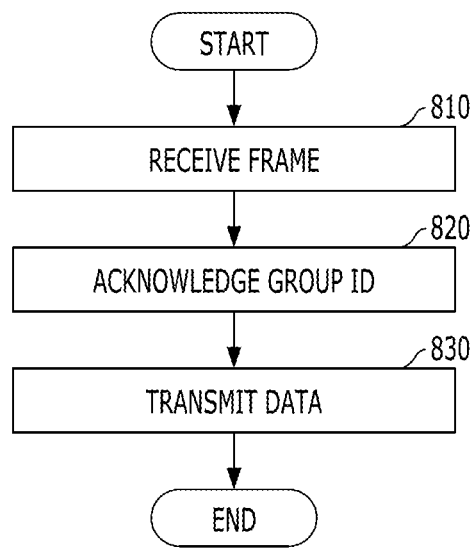
FIG. 8 is a diagram schematically illustrating a process of transmitting/receiving data using a MU-MIMO scheme of the STA in the communication system in accordance with the embodiment of the present invention.

FIG. 8 is a diagram schematically illustrating a process of transmitting/receiving data using the MU-MIMO scheme of the STA in the communication system in accordance with the embodiment of the present invention.

Referring to FIG. 8, in S810, the STA receives the frame including the group information of the STAs capable of transmitting/receiving data using the MU-MIMO scheme from the AP. Herein, the frame is already described in detail, and therefore the detailed description thereof will be omitted.

Next, in S820, the group information of the STAs included in the received frame is acknowledged, that is, the group ID assigned to the STA is acknowledged and in S830, the received frame is transmitted to the AP included in another mesh network and the data are also transmitted/received to/from the AP and other STAs using the MU-MIMO scheme based on the group information of the STAs.

As described above, in order to transmit/receive data to/from the APs and other SPAs included in the plurality of mesh networks using the MU-MIMO scheme, the STA transmits/receives the frame including the group information on the STAs in the plurality of mesh networks to/from the STAs to transmit/receive data between the APs and the STAs and between the STAs using the MU-MIMO scheme. Herein, the operation of transmitting/receiving data between the APs and the STAs and between the STAs using the MU-MIMO scheme is already described in detail, and therefore the detailed description thereof will be described.

In the communication system in accordance with the embodiment of the present invention, the data are normally transmitted/received between the AP and the STAs and between the STAs using the MU-MIMO scheme based on the group information of the STAs included in the frame by grouping the STAs capable of transmitting/receiving data using the MU-MIMO scheme and allowing the AP and the STAs, in particular, the APs and the STAs included in the plurality of mesh networks, respectively, to transmit/receive the frame including the group information of the STAs.

The embodiment of the present invention transmits/receives the frame including the group information of the STAs capable of transmitting/receiving data using the MU-MIMO scheme in the communication system to transmit/receive data between the AP and the plurality of STAs using the MU-MIMO scheme, transmit/receive data using the MU-MIMO between the STAs, and transmit/receive data between the AP and the STAs included in the plurality of mesh networks and between the STAs using the MU-MIMO scheme, thereby normally transmitting/receiving the large-capacity data.

Meanwhile, the embodiments is described in detail in the detailed description of the present invention, but may be variously modified without departing from the scope of the present invention. Accordingly, the scope of the present invention is not construed as being limited to the described embodiments but is defined by the appended claims as well as equivalents thereto.

What is claimed is:

1. A method for allowing a terminal to transmit or receive data using a multi user-multi input multi output (MU-MIMO) scheme in a communication system, the method comprising:
   receiving group information of terminals capable of transmitting or receiving data using the MU-MIMO scheme from an access point (AP);
   transmitting the group information of the terminals and group information of candidate terminals capable of transmitting or receiving data using the MU-MIMO based on the group information of the terminals to the candidate terminals, respectively; and
   transmitting or receiving data to or from the candidate terminals using the MU-MIMO scheme in response to the group information of the candidate terminals,
   wherein the group information is transmitted or received through a frame,
   wherein the frame includes group ID assignment information, a group ID table, a group inclusion indicating information, spatial stream position information, and group index range information as the group information.

2. The method of claim 1, wherein the receiving of the group information from the access point includes:
   requesting an authorization of the transmission and reception of data using the MU-MIMO to the AP; and
   receiving a token for an authority and the group information in response to the authorization request.

3. The method of claim 1, wherein the receiving of the group information from the access point includes:
   receiving group information in a first mesh network from a first access point of the first mesh network including the terminal; and
   receiving group information in a second mesh network from a second access point of the second mesh network including the terminal.

4. The method of claim 3, further comprising:
   acknowledging the group information in the first mesh network and the group information in the second mesh network;
   when the group information in the first mesh network is the same as the group information in the second mesh network, transmitting information indicating that the group information is the same to one of the first access point and the second access point; and
   receiving group information different from the same group information from the one access point.

5. The method of claim 4, further comprising:
   when a group ID included in the group information in the first mesh network is the same as a group ID included in the group information in the second mesh network, the information indicating that the group information is the same is information indicating group ID collision.

6. The method of claim 3, further comprising:
   transmitting the group information in the first mesh network to the second access point; and
   when the group information in the first mesh network is the same as the group information in the second mesh network, receiving group information different from the group information in the first mesh network as the group information in the second mesh network from the second access point.

7. The method of claim 6, wherein the group information is transmitted or received through the frame; and
   the frame includes group ID assignment information and group ID announcement information as the group information.

8. A method for allowing an access point (AP) to transmit or receive data using a multi user-multi input multi output (MU-MIMO) scheme in a communication system, the method comprising:
   receiving terminal information from terminals capable of transmitting or receiving data using the MU-MIMO scheme;
   grouping the terminals based on the terminal information and transmitting group information of the terminals to the terminals; and
   transmitting or receiving data to or from the terminals using the MU-MIMO based on the group information of the terminals,
   wherein the data are transmitted or received between the terminals using the MU-MIMO based on the group information of the terminals,
   wherein the group information is transmitted or received through a frame, wherein the frame includes group ID assignment information, a group ID table, a group inclusion indicating information, spatial stream position information, and group index range information as the group information.

9. The method of claim 8, wherein in the receiving of the terminal information, an authorization for transmission and reception of data using the MU-MIMO is requested from the terminal; and
in the transmitting of the group information of the terminals to the terminals, a token for an authority and the group information are transmitted in response to the authorization request.

10. The method of claim 8, wherein the transmitting of the group information of the terminals to the terminals includes:
transmitting, by a first access point of a first mesh network including the terminals, group information in the first mesh network including the terminal; and
transmitting, by a second access point of the second mesh network including the terminal, group information in a second mesh network.

11. The method of claim 10, further comprising:
receiving, by the first access point, the group information in the second mesh network and receiving, by the second access point, the group information in the first mesh network, from the terminals;
acknowledging the group information in the first mesh network and the group information in the second mesh network; and
when the group information in the first mesh network is the same as the group information in the second mesh network, transmitting, by one of the first access point and the second access point, group information different from the same group information to the terminals.

12. The method of claim 10, further comprising:
receiving, by the second access point, the group information in the first mesh network; and
when the group information in the first mesh network is the same as the group information in the second mesh network, transmitting, by the second access point, group information different from the group information in the first mesh network as the group information in the second mesh network.

13. The method of claim 10, wherein the group information is transmitted or received through the frame; and
the frame includes group ID assignment information and group ID announcement information as the group information.

14. An apparatus for transmitting or receiving data using a multi user-multi input multi output (MU-MIMO) scheme in a communication system, the apparatus comprising:
a receiving unit configured to receive group information of terminals capable of transmitting or receiving data using the MU-MIMO scheme from an access point (AP);
an acknowledgement unit comprising one or more processors configured to acknowledge the group information of the groups; and
a transmitting unit configured to transmit the group information of the terminals and group information of candidate terminals capable of transmitting or receiving data using the MU-MIMO based on the group information of the terminals to the candidate terminals, respectively,
wherein the receiving unit and the transmitting unit transmit or receive data to or from the candidate terminals using the MU-MIMO in response to the group information of the candidate terminals,
wherein the group information is transmitted or received through a frame,
wherein the frame includes group ID assignment and announcement information, a group ID table, a group inclusion indicating information, spatial stream position information, and group index range information as the group information.

15. The apparatus of claim 14, wherein the receiving unit receives the group information in the first mesh network from a first access point of a first mesh network including the terminals and receives the group information in the second mesh network from a second access point of a second mesh network including the terminals; and
when the group information in the first mesh network is the same as the group information in the second mesh network, receives group information different from the same group information to one of the first access point and the second access point.

16. An apparatus for transmitting or receiving data using a multi user-multi input multi output (MU-MIMO) scheme in a communication system, the apparatus comprising:
a receiving unit configured to receive terminal information from terminals capable of transmitting or receiving data using the MU-MIMO scheme;
a generation unit comprising one or more processors configured to group the terminals based on the terminal information and generate a frame including group information of the terminals; and
a transmitting unit configured to transmit the frame including the group information of the terminals,
wherein the transmitting unit and the receiving unit transmit or receive data to or from the terminals using the MU-MIMO based on the group information of the terminals, and
the data are transmitted or received between the terminals using the MU-MIMO based on the group information of the terminals,
wherein the frame includes group ID assignment and announcement information, a group ID table, a group inclusion indicating information, spatial stream position information, and group index range information as the group information.

17. The apparatus of claim 16, wherein the transmitting unit, in a first access point of a first mesh network including the terminals, transmits group information in the first mesh network including the terminal, and in a second access point of the second mesh network including the terminal, transmits group information in a second mesh network.

* * * * *